United States Patent
Suzuki

(10) Patent No.: US 11,494,553 B2
(45) Date of Patent: Nov. 8, 2022

(54) DOCUMENT CREATION ASSISTANCE APPARATUS AND NON-TRANSITORY COMPUTER READABLE MEDIUM

(71) Applicant: FUJIFILM Business Innovation Corp., Tokyo (JP)

(72) Inventor: Yuzuru Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 442 days.

(21) Appl. No.: 16/544,927

(22) Filed: Aug. 20, 2019

(65) Prior Publication Data

US 2020/0285695 A1 Sep. 10, 2020

(30) Foreign Application Priority Data

Mar. 4, 2019 (JP) .............................. JP2019-038449

(51) Int. Cl.
*G06F 17/00* (2019.01)
*G06F 40/186* (2020.01)
*G06F 3/0482* (2013.01)
*G06F 16/93* (2019.01)
*G06F 40/106* (2020.01)
*G06F 40/123* (2020.01)

(52) U.S. Cl.
CPC .......... *G06F 40/186* (2020.01); *G06F 3/0482* (2013.01); *G06F 16/93* (2019.01); *G06F 40/106* (2020.01); *G06F 40/123* (2020.01)

(58) Field of Classification Search
CPC .... G06F 40/186; G06F 40/106; G06F 40/123; G06F 40/131; G06F 16/93; G06F 3/0482
See application file for complete search history.

(56) References Cited

U.S. PATENT DOCUMENTS

| 7,593,961 B2 * | 9/2009 | Eguchi ................. G06V 30/414 |
| 9,665,963 B1 * | 5/2017 | Chang ..................... G06T 11/60 |
| 10,013,395 B2 * | 7/2018 | Kajiwara .............. G06F 40/106 |
| 10,445,063 B2 * | 10/2019 | Vohra .................... G06F 16/248 |
| 2005/0257127 A1 * | 11/2005 | Tanaka ............... G06Q 30/0241 715/277 |
| 2007/0079236 A1 * | 4/2007 | Schrier ................. G06F 40/114 715/209 |

(Continued)

FOREIGN PATENT DOCUMENTS

| JP | 2004-348706 | 12/2004 |
| JP | 2005085232 A * | 3/2005 |

(Continued)

*Primary Examiner* — Laurie A Ries
(74) *Attorney, Agent, or Firm* — JCIPRNET

(57) ABSTRACT

A document creation assistance apparatus includes an obtaining unit, an analyzing unit, an extracting unit, and a presenting unit. The obtaining unit obtains a first document. The analyzing unit calculates multiple features related to layout of the first document, the calculation being based at least in part on types of components of the first document. The extracting unit extracts one or more templates from among multiple templates based on the plurality of features related to the layout of the first document, the one or more templates each having layout similar to the layout of the first document. The presenting unit presents the extracted one or more templates to a user.

13 Claims, 8 Drawing Sheets

(56) References Cited

U.S. PATENT DOCUMENTS

| | | | | |
|---|---|---|---|---|
| 2007/0101253 A1* | 5/2007 | Bohle | ............... | G06F 40/174 |
| | | | | 707/999.001 |
| 2009/0094508 A1* | 4/2009 | Kanzaki | ............... | G06F 40/186 |
| | | | | 715/201 |
| 2013/0179381 A1* | 7/2013 | Kawabata | ............... | G06N 5/02 |
| | | | | 706/46 |
| 2015/0356070 A1* | 12/2015 | Arai | ............... | G06F 40/186 |
| | | | | 715/234 |
| 2016/0124918 A1* | 5/2016 | Ying | ............... | G06F 16/9577 |
| | | | | 715/234 |
| 2016/0364398 A1* | 12/2016 | Nelson | ............... | G06F 40/106 |
| 2018/0032481 A1* | 2/2018 | Ishida | ............... | G06F 40/106 |
| 2018/0096203 A1* | 4/2018 | King | ............... | G06F 16/00 |
| 2019/0114308 A1* | 4/2019 | Hancock | ............... | G06F 40/18 |
| 2020/0074169 A1* | 3/2020 | Mukhopadhyay | ............... | G06Q 50/18 |
| 2020/0342167 A1* | 10/2020 | Sivaji | ............... | G06F 3/0482 |
| 2022/0110201 A1* | 4/2022 | Alexanderson | ............... | G01S 15/88 |

FOREIGN PATENT DOCUMENTS

| | | |
|---|---|---|
| JP | 4433741 | 3/2010 |
| JP | 5800790 | 10/2015 |

\* cited by examiner

FIG. 3

| DATE | USER ID | FIRST DOCUMENT ID | COMPONENT DATA | TEMPLATE ID | ATTRIBUTE INFORMATION ||||||  |
|---|---|---|---|---|---|---|---|---|---|---|
| | | | | | DOCUMENT TYPE | SIZE | THEME | PUBLICATION TIME | AGE | SEX |
| ⋮ | ⋮ | ⋮ | ⋮ | ⋮ | ⋮ | ⋮ | ⋮ | ⋮ | ⋮ | ⋮ |
| ⋮ | U01 | R14 | ⋮ | T04 | CATALOG | POSTCARD | TRIP | FALL | 30- | MALE |
| ⋮ | U02 | R15 | ⋮ | T21 | FLIER | A3 | HOUSE | EARLY SUMMER | 40- | FEMALE |
| ⋮ | ⋮ | ⋮ | ⋮ | ⋮ | ⋮ | ⋮ | ⋮ | ⋮ | ⋮ | ⋮ |

122

DOCUMENT CREATION ASSISTANCE APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-038449 filed Mar. 4, 2019.

BACKGROUND

(i) Technical Field

The present disclosure relates to a document creation assistance apparatus and a non-transitory computer readable medium.

(ii) Related Art

In a case where a document is created by using various components such as text, photographs, and illustrations in combination, the arrangement of these components in the document, that is, layout of the document may play a leading role. The layout of the document influences the impression of the document on its viewers. In particular, the layout may influence sales of merchandise of a document for advertisement such as flier or catalog.

Various techniques have been developed for assisting creation of a document. Japanese Patent No. 5800790 describes a method for creating a document in the following manner. A user designates multiple basic layer templates and personal component data. Upon the designation, the designated multiple basic layer templates are superposed in a set order to generate a multi-layer template. The personal component data flows into the multi-layer template, and thereby a document such as an electronic album is created.

SUMMARY

Aspects of non-limiting embodiments of the present disclosure relate to presenting one or more templates having layout similar to layout of an obtained first document and helping a user to create a new second document by using any of the one or more templates.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a document creation assistance apparatus including an obtaining unit, an analyzing unit, an extracting unit, and a presenting unit. The obtaining unit obtains a first document. The analyzing unit calculates multiple features related to layout of the first document, the calculation being based at least in part on types of components of the first document. The extracting unit extracts one or more templates from among multiple templates based on the multiple features related to the layout of the first document, the one or more templates each having layout similar to the layout of the first document. The presenting unit presents the extracted one or more templates to a user.

BRIEF DESCRIPTION OF THE DRAWINGS

An exemplary embodiment of the present disclosure will be described in detail based on the following figures, wherein:

FIG. 3 illustrates an example of a history DB;

DETAILED DESCRIPTION

Exemplary Embodiment

Configuration of Document Creation Assistance Apparatus

Figure 1:
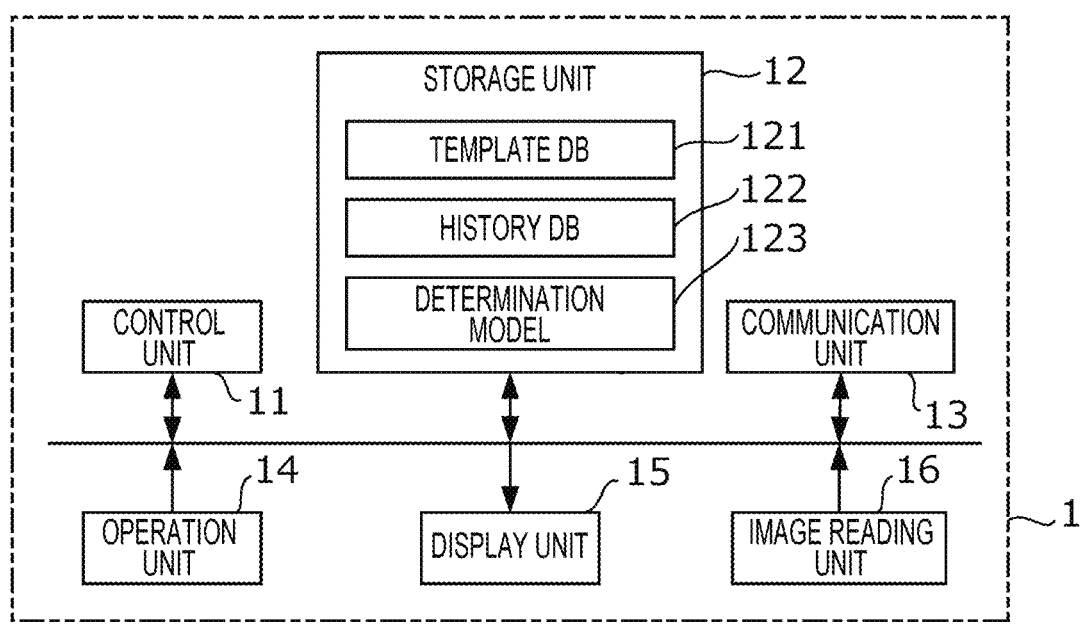
FIG. 1 illustrates an example of the configuration of a document creation assistance apparatus.

FIG. 1 illustrates an example of the configuration of a document creation assistance apparatus 1. As illustrated in FIG. 1, the document creation assistance apparatus 1 includes a control unit 11, a storage unit 12, a communication unit 13, an operation unit 14, and a display unit 15.

The control unit 11 includes a central processing unit (CPU), a read only memory (ROM), and a random access memory (RAM). The CPU reads and executes a computer program (hereinafter simply referred to as a program) stored in the ROM and the storage unit 12 so as to control the units of the document creation assistance apparatus 1.

The communication unit 13 is a communication circuit connected to a communication line (not illustrated) with wires or wirelessly. By using the communication unit 13, the document creation assistance apparatus 1 transmits and receives information to and from an external apparatus connected to the communication line.

The operation unit 14 includes an operation element such as an operation button, a keyboard, or a touch panel for giving an instruction, and in response to a user operation, transmits a signal corresponding to the operation to the control unit 11.

The display unit 15 includes a display screen such as a liquid crystal display and displays an image under control of the control unit 11. On the display screen, a transparent touch panel of the operation unit 14 may be superposed.

The storage unit 12 is a storage such as a solid state drive or a hard disk drive and stores a program, data, and the like to be read by the CPU of the control unit 11.

The storage unit 12 also stores a template database (DB) 121, a history DB 122, and a determination model 123.

Figure 2:
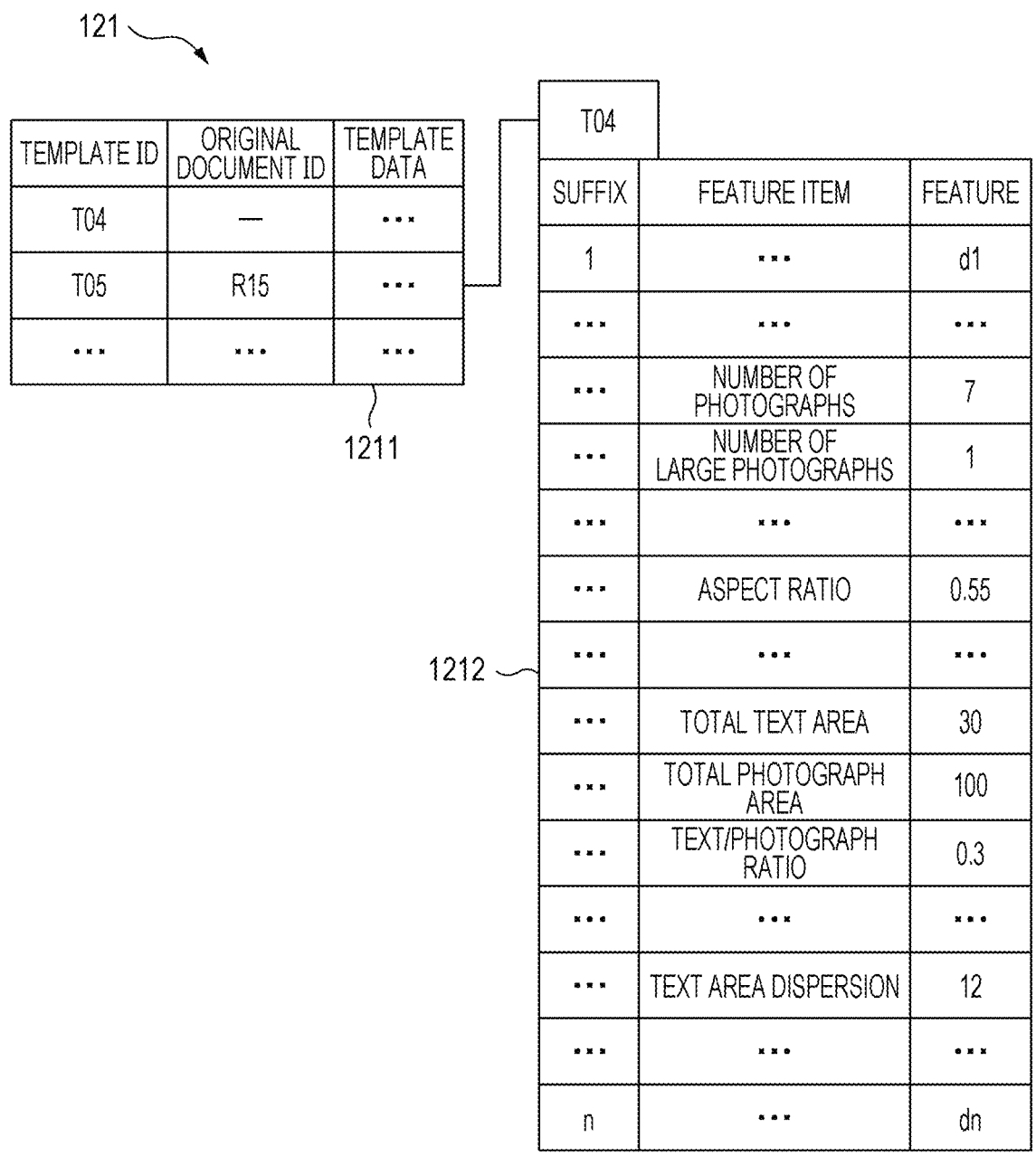
FIG. 2 illustrates an example of a template database (DB)

FIG. 2 illustrates an example of the template DB 121. As illustrated in FIG. 2, the template DB 121 includes a template list 1211 and a feature list 1212.

The template list 1211 is a list that stores multiple templates. Each template is used as a pattern and defines (1) types of components and (2) sizes and arrangement of the components for creating a document by using the template. The components are arranged in accordance with layout of the template to create a document. The template may be generated from an existing document (hereinafter referred to as an original document).

In the template list 1211, template data representing details of each template is associated with a template ID that is identification information for identifying the template. The template data is described by, for example, a data description language determined by RFC 8259 or the like.

In addition, if a template is generated from the above-described original document, in the template list 1211 illustrated in FIG. 2, the template is associated with an original document ID that is identification information of the original document.

For example, in the template list 1211 illustrated in FIG. 2, a template ID "T04" is associated with an original document ID "-" indicating that the original document is absent. That is, the template identified by the template ID "T04" is not generated from an original document. On the other hand, a template ID "T05" is associated with an original document ID "R15". This means that the template identified by the template ID "T05" is generated from an original document identified by the original document ID "R15".

The feature list 1212 is provided for each template ID described in the template list 1211. The feature list 1212 for the template ID "T04" stores multiple features related to the template of the template ID "T04". The features may be extracted from template data, for example. The features represent features of layout of a template that is identified by a corresponding template ID and are expressed in interval scale or proportional scale. In addition, the storage unit 12 that stores the template DB 121 including the feature list 1212 serves as a storage that stores the multiple templates such that each of the multiple templates is stored in association with features related to layout of the corresponding one of the templates.

Examples of the features include information indicating the number of frames for a specific type of component, such as "number of photographs" or "number of large photographs". The number of photographs is the total number of photographs included in a template, and the number of large photographs is the total number of photographs exceeding a predetermined size among the photographs included in the template.

Examples of the features also include information indicating the shape of a component, such as "aspect ratio". The aspect ratio of a component is expressed in, for example, a ratio of the width to the height of a region of the component. The aspect ratio may be calculated for each type of a component, such as photograph or text. If multiple components are present, the aspect ratio may be a representative aspect ratio of the components, such as an average or a mode.

Examples of the features further include information indicating the area of a component, such as "total text area" or "total photograph area". The total text area indicates the total area of a text region in a template. The total photograph area indicates the total photograph region in a template.

Examples of the features further include information indicating a ratio of the area of a certain type of component to the area of another type of component, such as "text/photograph ratio".

Examples of the features further include information indicating a variation in the area of a particular type of component, such as "text area dispersion" or "photograph area dispersion". The text area dispersion is a feature representing a variation in multiple text areas included in a template, by using dispersion of area.

For example, as illustrated in FIG. 2, the number of photographs as a feature in the template of the template ID "T04" is "7". In addition, the aspect ratio of a component such as a photograph in this template is "0.55".

Note that the type of a component (e.g., photograph or text) may be subdivided. For example, the photograph may be categorized depending on whether the photograph is a portrait of a person or a landmark such as a location or a landscape. In addition, the text may be categorized into small characters, medium characters, large characters, and the like depending on the font size.

In the feature list 1212 illustrated in FIG. 2, a template has n (n is an integer of 1 or greater) features that are distinguished from one another by using suffixes 1 to n. As illustrated in FIG. 2, each feature of the template is expressed as $d_i$ (i is a suffix). Note that the feature list 1212 may include, in any of the features, a constant that is common to all the templates, such as "1". This constant, for example, serves as a term that is called as a constant term or a bias term in a regression equation.

FIG. 3 illustrates an example of the history DB 122. As illustrated in FIG. 3, the history DB 122 stores a history of template use. That is, the storage unit 12 that stores the history DB 122 serves as a storage that stores the template use history.

In the exemplary embodiment, the history DB 122 stores records of template use with a timestamp, a user ID, a first document ID, component data, a template ID, and attribute information of a second document.

The template ID in the history DB 122 is identification information of a template that was selected by the user from among one or more templates presented by the document creation assistance apparatus 1. The history DB 122 may further or alternatively store template IDs of templates that were not selected by the user. In the exemplary embodiment, the history DB 122 stores identification information of a selected template.

The user ID in the history DB 122 is identification information of the user who selected the template. That is, the storage unit 12 that stores the history DB 122 serves as a storage that stores information of the user in association with the identification information of the selected template.

The first document ID in the history DB 122 is identification information of a document that was analyzed to extract one or more templates that had been presented to the user for the selection (hereinafter referred to as a first document). The component data is data indicating one or more components designated by the user to be arranged in accordance with the selected template.

The attribute information is information indicating an attribute of a document that the user created in accordance with the selected template (hereinafter referred to as a second document). That is, the storage unit 12 that stores the history DB 122 serves as a storage that stores attribute information in association with the selected template. The attribute information is designated, for example, on the operation unit 14 by the user when the user creates the second document. The attribute information is expressed in nominal scale or ordinal scale.

As illustrated in FIG. 3, the attribute information includes, for example, a document type, size, theme, publication time, age, sex, and the like. The document type is information indicating the type of the second document, and is expressed by a character string such as "catalog", "flier", "brochure", or "poster", identification information thereof, or the like. The size is information indicating the size of a medium such as a sheet onto which the second document is to be output, and is expressed by a character string such as "postcard", "envelope", "B5", "A4", or "letter size", identification information thereof, or the like. The theme is information indicating a target expressed in the second document, and is expressed by a character string such as "trip", "house", "exhibition", "event", or "education", identification information thereof, or the like.

The publication time is information indicating the time when the second document is supposed to be published. The age and sex are information indicating a presumed age and a presumed sex of a viewer of the second document.

Figure 4:
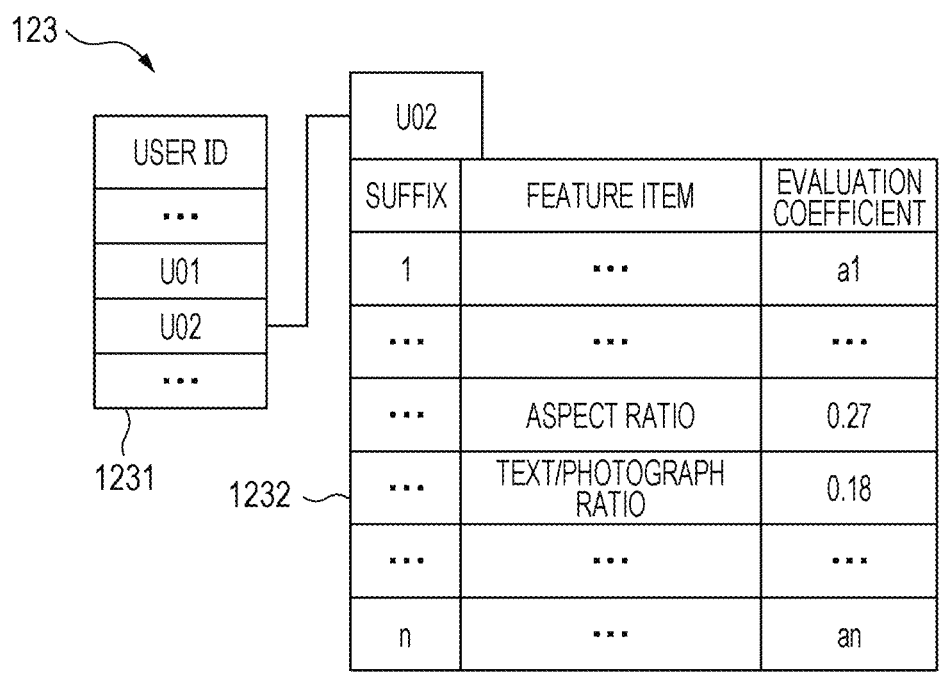
FIG. 4 illustrates an example of a determination model.

FIG. 4 illustrates an example of the determination model 123. The determination model 123 is a model used for determining a level of similarity in layout between the first document and each of the multiple templates stored in the template DB 121.

The determination model 123 illustrated in FIG. 4 includes a user list 1231 and an evaluation coefficient list 1232. The user list 1231 is a list of user IDs, which are identification information of users. The evaluation coefficient list 1232 is a list provided for each of the user IDs. The evaluation coefficient list 1232 stores multiple evaluation coefficients calculated based on a history of template use of the user identified by the user ID. Each of the evaluation coefficients is a coefficient indicating the weight of a corresponding one of the features. For example, as the evaluation coefficient of a feature is higher, the user has put a greater importance on the feature.

The evaluation coefficient list 1232 illustrated in FIG. 4 stores n evaluation coefficients that are distinguished from one another by using suffixes 1 to n. As illustrated in FIG. 4, each evaluation coefficient is expressed as $a_i$ (i is a suffix).

Functional Configuration of Document Creation Assistance Apparatus

Figure 5:
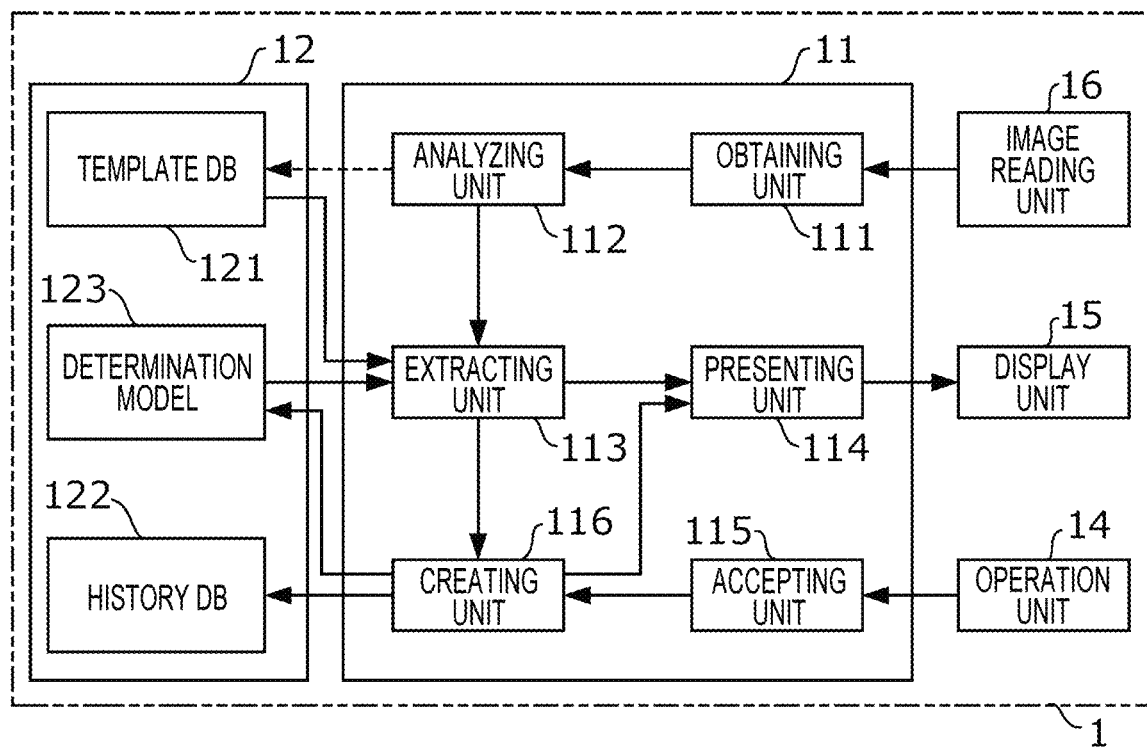
FIG. 5 illustrates an example of a functional configuration of the document creation assistance apparatus.

FIG. 5 illustrates an example of a functional configuration of the document creation assistance apparatus 1. The control unit 11 of the document creation assistance apparatus 1 reads and executes a program stored in the storage unit 12 so as to serve as an obtaining unit 111, an analyzing unit 112, an extracting unit 113, a presenting unit 114, an accepting unit 115, and a creating unit 116.

The accepting unit 115 accepts user operations on the operation unit 14. When the accepting unit 115 accepts a user operation for obtaining the first document, the obtaining unit 111 obtains an image of the first document from an image reading unit 16 (see FIG. 1).

When the accepting unit 115 accepts a user operation for obtaining one or more components, the obtaining unit 111, for example, obtains data of the one or more components from the image reading unit 16. That is, the obtaining unit 111 serves as an obtaining unit that obtains a first document and one or more components.

When the accepting unit 115 accepts a user operation for designating attribute information of the second document, the obtaining unit 111 obtains the attribute information of the second document designated on the operation unit 14. That is, the obtaining unit 111 serves as an obtaining unit that obtains the attribute information indicating an attribute of the second document.

The analyzing unit 112 calculates multiple features related to layout of the first document from the image of the first document obtained by the obtaining unit 111. Specifically, for example, the analyzing unit 112 performs edge detection processing for detecting a contour by binarizing the image of the first document, identifies regions of components included in the first document, and identifies the types of the components on the basis of, for example, distribution of tonal values of pixels included in the identified regions in the image of the first document.

The analyzing unit 112 calculates the multiple features illustrated in the feature list 1212 on the basis of the types and regions of the components identified from the first document.

That is, the analyzing unit 112 serves as an analyzing unit that calculates the features related to the layout of the first document. The analyzing unit 112 calculates n features that are distinguished from one another by using suffixes 1 to n, each of which is expressed as $b_i$ (i is a suffix).

In particular, for example, the multiple features illustrated in the feature list 1212 in FIG. 2 include features indicating the area or aspect ratio of each of the types of the components as described above. In this case, the analyzing unit 112 performs analysis on the basis of the area or aspect ratio of each of the types of the components of the first document. In this case, the analyzing unit 112 serves as an analyzing unit that calculates the features indicating the area or aspect ratio of each of the types of the components of the first document.

In addition, for example, the multiple features illustrated in the feature list 1212 in FIG. 2 include a feature indicating the variation in the area of a particular type of component as described above. In this case, the analyzing unit 112 serves as an analyzing unit that calculates the feature indicating the variation of the components of the first document.

Note that in a case where a template is to be generated from the first document, the analyzing unit 112 illustrated in FIG. 5 generates a new template on the basis of the types and regions of the components identified from the first document and stores it in the template DB 121. The new template is, for example, generated by deleting the components of the first document from the first document and leaving information of the types of the components, positions of the components, and sizes of the components in combination.

Subsequently, the analyzing unit 112 stores the identification information of the first document as a base of the new template, that is, the first document ID, in the template list 1211 in the template DB 121 as the original document ID.

For each of the multiple templates stored in the template DB 121 in the storage unit 12, the extracting unit 113 calculates an amount based on a difference between the features stored in the feature list 1212 and the features calculated by the analyzing unit 112. The amount based on a difference is an absolute value of the difference, a square of the difference, or the like.

Subsequently, the extracting unit 113 applies, to the calculated amount, a model illustrated in the determination model 123 to extract one or more templates having layout similar to the layout of the first document.

For example, the extracting unit 113 calculates a level of similarity as will be described later and extracts one or more templates having a high level of similarity (small or short distance) as one or more templates similar to the first document. That is, the extracting unit 113 serves as an extracting unit that extracts one or more templates from among multiple templates, the one or more templates each having layout similar to the calculated feature.

In addition, the extracting unit 113 uses the feature list 1212 in the template DB 121. The feature list 1212 stores the multiple templates such that each of the multiple templates is stored in association with the multiple features related to layout of the corresponding one of the multiple templates. Thus, the extracting unit 113 serves as an extracting unit that extracts one or more templates on the basis of the features stored in the storage.

In addition, as described above, the extracting unit 113 applies a model illustrated in the determination model 123 to extract one or more templates. Subsequently, as will be described later, the determination model 123 is updated in accordance with a history stored in the history DB 122. Thus, the extracting unit 113 serves as an extracting unit that extracts one or more templates in accordance with the history.

Furthermore, the extracting unit 113 uses the determination model 123 including the user list 1231 and the evaluation coefficient list 1232. The determination model 123 includes the evaluation coefficient list 1232 in which, for each of the user IDs stored in the user list 1231, and the extracting unit 113 reads an evaluation coefficient associated with the user ID of a user from the evaluation coefficient list 1232, and extracts one or more templates. Thus, the extracting unit 113 serves as an extracting unit that extracts one or more templates in accordance with the user.

The presenting unit 114 causes the display unit 15 to display the one or more templates extracted by the extracting unit 113 to present the one or more templates to the user. That is, the presenting unit 114 serves as a presenting unit that presents the extracted one or more templates to the user.

Looking through the presented one or more templates, the user selects any of the one or more templates and designates the selected template on the operation unit 14. The accepting unit 115 accepts the selection. The accepting unit 115 serves as an accepting unit that accepts selection of a template by the user from among the one or more templates.

The creating unit 116 creates the second document by using template data of the template indicated by the selection accepted by the accepting unit 115 and one or more components obtained by the obtaining unit 111. The second document is created by arranging the obtained one or more components in accordance with the template designated by the user. That is, the creating unit 116 serves as a creating unit that creates the second document having one or more components, the one or more components being arranged in accordance with the designated template.

The creating unit 116 illustrated in FIG. 5 creates the second document and stores the selection accepted from the user in the history DB 122. In addition, the creating unit 116 illustrated in FIG. 5 updates the determination model 123 on the basis of the history stored in the history DB 122.

Operations of Document Creation Assistance Apparatus

Figure 6:
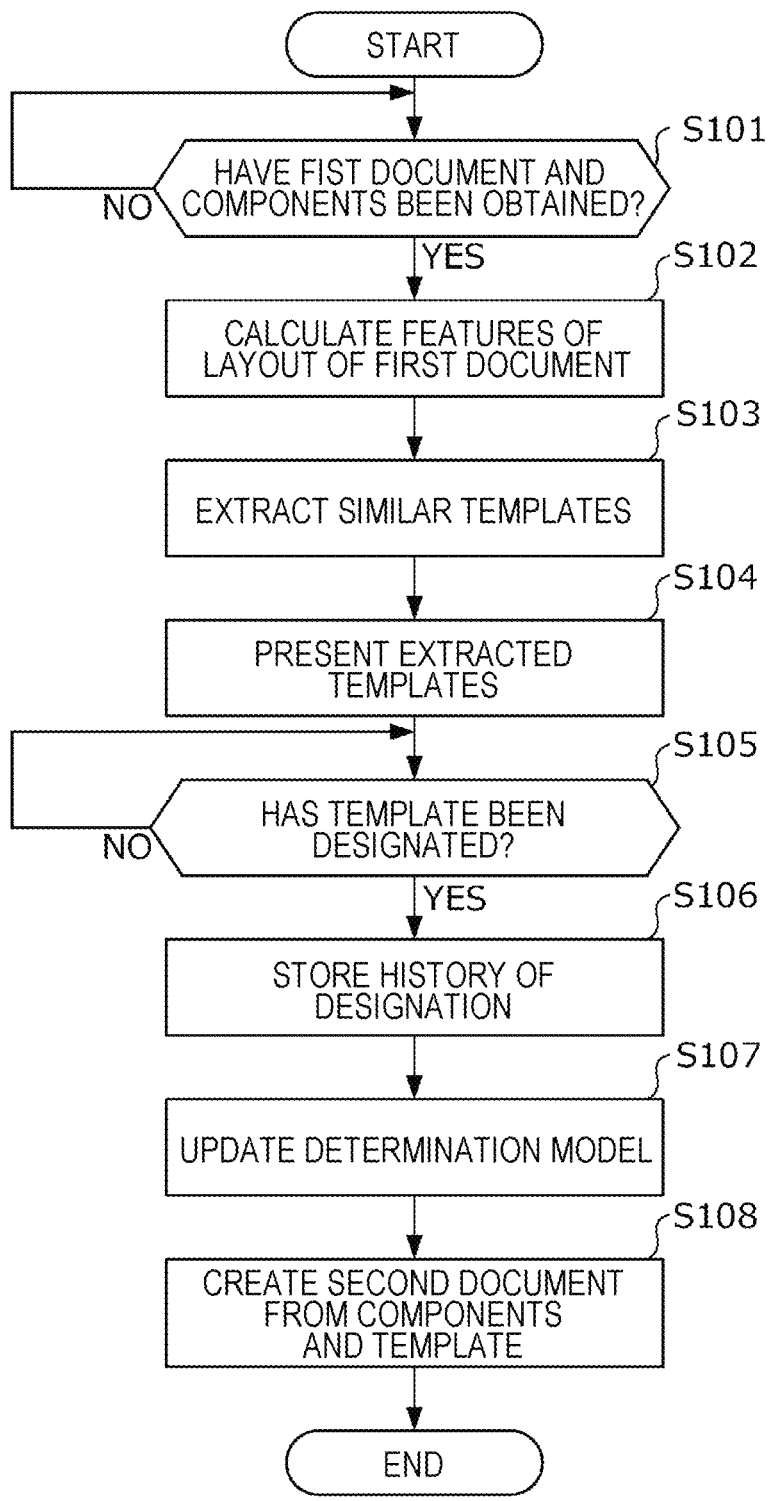
FIG. 6 is a flowchart illustrating a flow of operations of the document creation assistance apparatus.

FIG. 6 is a flowchart illustrating a flow of operations of the document creation assistance apparatus 1. As illustrated in FIG. 6, the control unit 11 of the document creation assistance apparatus 1 determines whether an image of a first document and data of one or more components have been obtained from the image reading unit 16 (step S101). While it is determined that these are not obtained (step S101; NO), this determination is repeated.

On the other hand, if it is determined that an image of a first document and data of one or more components have been obtained (step S101; YES), the control unit 11 calculates features related to layout of the obtained first document (step S102).

Upon analysis of the features related to the layout of the first document, the control unit 11 extracts one or more templates having layout similar to the calculated features from among multiple templates stored in the template DB 121 stored in the storage unit 12 (step S103).

Step S103 for extracting one or more templates is performed as follows, for example. The control unit 11 sequentially selects templates one by one from among the multiple templates stored in the template DB 121. Then, the control unit 11 calculates a level of similarity Ls indicating the level of similarity between the selected template and the analyzed first document. The level of similarity Ls is calculated according to the following expression (1) by using n evaluation coefficients $a_i$, n features $b_i$, and n features $d_i$.

$$Ls = \sum_{i=1}^{n} a_i \times |b_i - d_i| \qquad (1)$$

In the above expression, the evaluation coefficients $a_i$ are the evaluation coefficients stored in the evaluation coefficient list 1232 described above. The features $b_i$ are the features related to the layout of the first document calculated in step S102. The features $d_i$ are the features related to layout of the selected template.

That is, the level of similarity Ls is expressed by a sum of numerical values multiplied by the corresponding evaluation coefficients, the numerical values being absolute differences between the n features related to the layout of the selected template and the n features related to the layout of the obtained first document. Since the evaluation coefficient list 1232 described above is provided for each of the user IDs, the evaluation coefficients reflect a tendency of selection by a user that is identified by the user ID.

The control unit 11 calculates levels of similarity Ls of the multiple templates and extracts templates in the ascending order of the level of similarity Ls (ascending order of the distance) as the "one or more templates" described above. Thus, for a user who operates the document creation assistance apparatus 1, the one or more templates having layout similar to the layout of the first document are extracted.

The control unit 11 causes the display unit 15 to display the one or more templates extracted in step S103 to present them to the user (step S104).

Figure 7A:
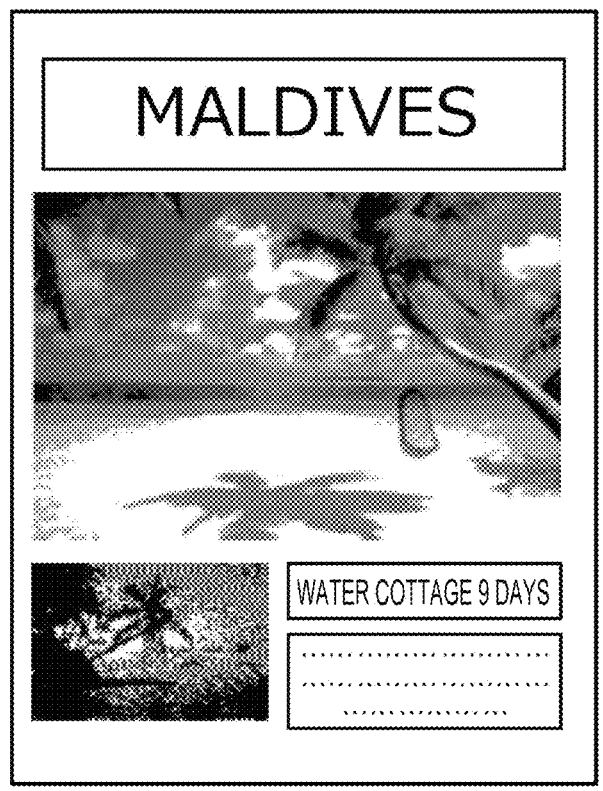
FIGS. 7A and 7B respectively illustrate an example of a first document and examples of templates.
Figure 7B:
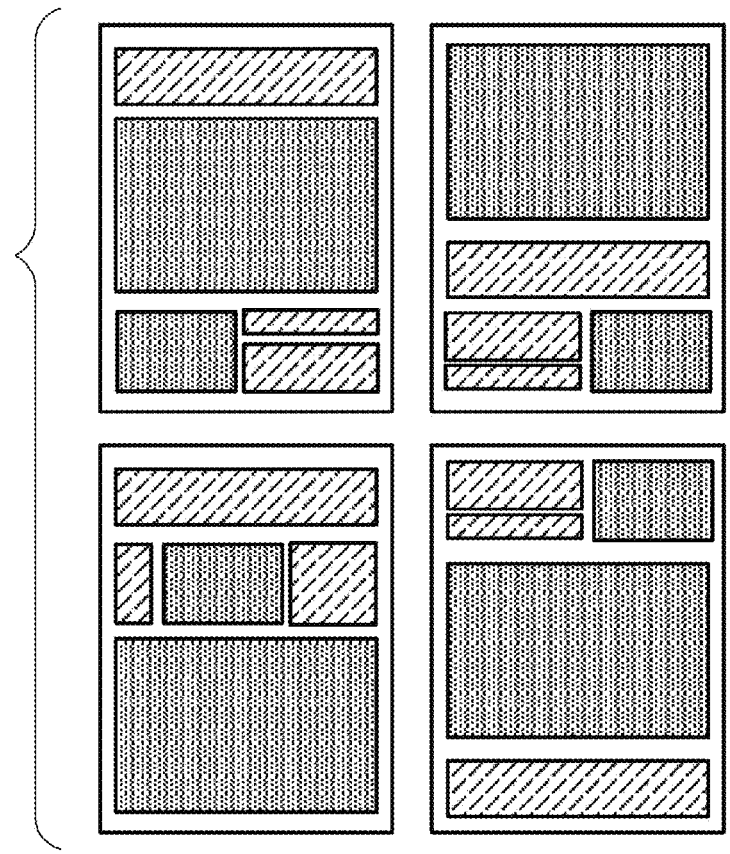

FIGS. 7A and 7B respectively illustrate an example of the first document and examples of templates. FIG. 7A illustrates an example of the first document obtained from the image reading unit 16 and analyzed in step S102. As a result of the analysis, for example, the first document is identified as a document in which two photographs and three types of text as components are arranged with their aspect ratios and area ratios, for example.

FIG. 7B illustrates examples of four templates extracted as the templates having layout similar to the layout of the first document. Although the sizes, positions, and the like of the components of these four templates differ from each other, the components are generally arranged in a similar manner.

The control unit 11 controls the display unit 15 to display the four templates illustrated in FIG. 7B for the user. The templates are displayed, for example, as images in which regions of components of the templates are painted in different colors that are assigned to the respective types of components.

Looking through the four templates illustrated in FIG. 7B, the user selects any of them and performs an operation for designating the selected template on the operation unit 14. The control unit 11 determines whether selection of a template from the user has been accepted (step S105). While it is determined that selection has not been accepted (step S105; NO), this determination is repeated.

On the other hand, if it is determined that selection of a template from the user has been accepted (step S105; YES), the control unit 11 stores information about the template that has been selected in the history DB 122 (step S106).

Subsequently, the control unit 11 updates the determination model 123 by using the history DB 122 (step S107). For example, the control unit 11 searches a user ID field in the history DB 122 and extracts a record in which the same user ID as the user ID of the user that has designated the template in step S105 is described. Then, by maximum likelihood estimation using the extracted record, the control unit 11 updates the n evaluation coefficients associated with the above user ID in the determination model 123.

In this case, for example, the control unit 11 treats the amount based on a difference between the n features of each of the templates and the n features of the first document as an explanatory variable. Then, on the basis of the template ID field in the history DB 122, the control unit 11 treats information as to whether a template has been designated as a criterion variable.

In addition, if the control unit 11 determines that selection of the template from the user has been accepted, the control unit 11 creates the second document from the obtained components and the designated template (step S108).

Figure 8:
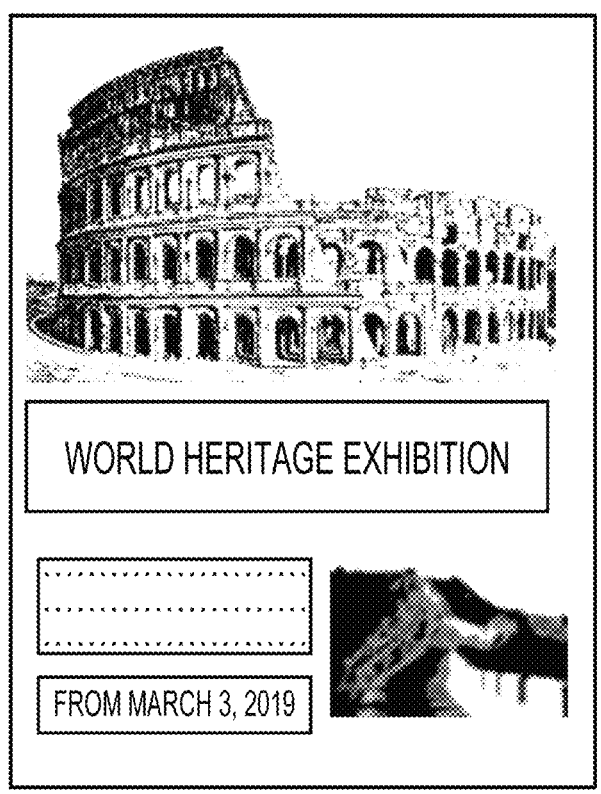
FIG. 8 illustrates an example of a second document.

FIG. 8 illustrates an example of the second document. The second document illustrated in FIG. 8 is created by using the template selected by the user from among the one or more extracted templates illustrated in FIG. 7B, and by arranging the one or more components obtained from the user.

As described above, the document creation assistance apparatus 1 according to the exemplary embodiment of the present disclosure creates the second document by arranging the one or more components provided from the user, in accordance with the template that is similar to the first document and that is selected by the user. That is, the document creation assistance apparatus 1 does not create the second document by directly using the layout of the first document provided from the user.

The user may be not accustomed to document creation or may have few opportunities to have diverse designs. Such a user selects the first document as a model from among a few documents that the user has had. Thus, the first document may be mismatched with the user's desired purpose of the second document. However, since the document creation assistance apparatus 1 presents one or more templates having layout that is similar to but different from the layout of the first document selected as a model, the user has more opportunities for layout selection.

In addition, in some cases, the layout of the first document may be incorrectly analyzed from an image of the first document owing to, for example, noise generated in reading the image. In such a case, if components provided from the user are arranged on the basis of the analysis result of the first document to create the second document, the created second document may have incorrect layout. However, since the document creation assistance apparatus 1 according to the exemplary embodiment of the present disclosure does not directly use the layout of the first document selected by the user as a model, the second document that matches the user's purpose may be created with a higher possibility.

Furthermore, for various reasons, the user may be unwilling to directly use the layout of the first document as a model. Since the document creation assistance apparatus 1 according to the exemplary embodiment of the present disclosure arranges the components by using layout similar to the layout of the first document, instead of the common layout of the first document, the created second document is not strikingly similar to the first document in layout.

MODIFICATIONS

The exemplary embodiment has been described above. The exemplary embodiment may be modified as follows. The following modifications may be used in combination.

First Modification

The control unit 11 calculates the level of similarity Ls to extract one or more templates similar to the first document in the above embodiment. However, without limitation to this, the control unit 11 may extract the one or more templates by applying another method such as logistic regression, decision tree/regression tree, multiple repression analysis, neural network, support vector machine, or ensemble learning. In this case, the determination model 123 has a configuration in accordance with the method.

For example, the control unit 11 calculates the sum of values based on differences between the features of the first document and the features of each of the templates multiplied by corresponding evaluation coefficients. Then, the control unit 11 may extract, as the one or more templates similar to the first document, one or more templates for which the calculated sum is less than a predetermined threshold.

In addition, for example, in a case where a neural network is employed, the determination model 123 may store evaluation coefficients corresponding to each node of an input layer and each node of an intermediate layer.

Second Modification

In the above embodiment, the control unit 11 updates the determination model 123 from the history DB 122 by maximum likelihood estimation. However, without limitation to this, the control unit 11 may, for example, update the evaluation coefficients to be stored in the determination model 123 by a least squares method.

Third Modification

In the above embodiment, the storage unit 12 stores the template DB 121 including the feature list 1212. However, the template DB 121 does not necessarily include the feature list 1212. In this case, each time one or more templates having layout similar to layout of the first document are extracted from the template DB 121, features indicating the layout may be calculated from each of multiple templates stored in the template DB 121.

Fourth Modification

In the above embodiment, the storage unit 12 stores the history DB 122. However, the storage unit 12 does not necessarily store the history DB 122. In this case, the determination model 123 is not necessarily updated in accordance with a history of selection accepted by the document creation assistance apparatus 1.

Fifth Modification

In the above embodiment, the determination model 123 includes the user list 1231, and the evaluation coefficient list 1232 is provided for each of the user IDs. However, without limitation to this, the determination model 123 does not necessarily include the user list 1231. In this case, the evaluation coefficient list 1232 included in the determination model 123 stores evaluation coefficients without distinguishing the users. In addition, in this case, the history DB 122 does not necessarily store the user ID of the user who has made the accepted selection.

Sixth Modification

In addition, the determination model 123 may include the evaluation coefficient list 1232 for each group of users. For example, the users are sectioned into five groups in accordance with a design skill level. The extracting unit 113 reads an evaluation coefficient from the evaluation coefficient list 1232 corresponding to a group of users. Then, by using the read evaluation coefficient, the extracting unit 113 extracts one or more templates having layout similar to layout of the first document.

Seventh Modification

Furthermore, the determination model 123 may include a list of types of components to be used for creating the second document. In addition, the determination model 123 may include the evaluation coefficient list 1232 for each of the types of components. In this case, the extracting unit 113 identifies the type of obtained one or more components to be used for creating the second document and reads the evaluation coefficient from the evaluation coefficient list 1232 corresponding to this type. Then, by using the read evaluation coefficient, the extracting unit 113 extracts the above one or more templates.

In addition, in this case, the history DB 122 stores component data of the one or more components obtained when the user designates a template. That is, the storage in this modification serves as a storage that stores the obtained one or more components in accordance with the selection. In addition, the extracting unit 113 in this modification serves as an extracting unit that extracts one or more templates in accordance with the obtained one or more components.

Eighth Modification

Furthermore, the determination model 123 may include the evaluation coefficient list 1232 for each piece of the attribute information of the second document to be created. In this case, the extracting unit 113 identifies the attribute information of the second document to be created, and reads the evaluation coefficient from the evaluation coefficient list 1232 corresponding to the attribute information. Then, by using the read evaluation coefficient, the extracting unit 113 extracts the above one or more templates. That is, the extracting unit 113 in this modification serves as an extracting unit that extracts one or more templates in accordance with the obtained attribute information.

Ninth Modification

Furthermore, the evaluation coefficient list 1232 included in the determination model 123 may store, in addition to the evaluation coefficients corresponding to the features related to the layout, an evaluation coefficient corresponding to information related to selection for creating the second document. The information related to selection for creating the second document is, for example, information based on the user, components used for the second document, and the attribute of the second document. Among these pieces of information, information expressed in nominal scale or ordinal scale may be, for example, converted into a numerical value that is applicable as an explanatory variable by so-called one hot encoding.

Tenth Modification

In addition, the evaluation coefficient list 1232 included in the determination model 123 may store, in addition to the evaluation coefficients corresponding to the features related to the layout, an evaluation coefficient corresponding to information related to evaluation of templates. The information related to evaluation of templates may be based on, for example, totaled results of answers to questionnaire from multiple users. This information may indicate a use frequency or popularity of templates. In addition, this information may indicate sales promotion effects such as sales generated by the created second document.

Eleventh Modification

In the above embodiment, in a case where the analyzing unit 112 generates a template from the first document, the analyzing unit 112 creates a new template on the basis of types and regions of components identified from the first document and stores it in the template DB 121. However, the storage unit 12 of the document creation assistance apparatus 1 may add the obtained first document as a new template to the template DB 121. That is, the storage unit 12 serves as a storage that stores multiple templates, and if an obtaining unit obtains the first document, adds the first document as a new template to the multiple templates.

Twelfth Modification

In the above embodiment, in step S101, the control unit 11 determines whether an image of the first document and data of one or more components have been obtained. However, it may be determined whether the image of the first document is obtained. In this case, for example, before step S106, the control unit 11 determines whether data of one or more components has been obtained.

Thirteenth Modification

In the above embodiment, the control unit 11 executes step S108 after step S107. However, for example, the control unit 11 may perform step S108 before step S106 or before step S107. That is, as long as one or more components have been obtained and the selection of a template has been accepted, the control unit 11 may create the second document by using the one or more components and the selected template.

Fourteenth Modification

In the above embodiment, the document creation assistance apparatus 1 includes the communication unit 13. However, if no communication occurs with an external apparatus, the communication unit 13 may be omitted.

In addition, in the above embodiment, the obtaining unit 111 obtains images of the first document and the one or more components from the image reading unit 16. However, without limitation to this, the obtaining unit 111 may, for example, obtain the image of the first document and the one or more components from an external apparatus connected to a communication line (not illustrated) through the communication unit 13.

Fifteenth Modification

The program executed by the control unit 11 of the document creation assistance apparatus 1 may be provided by being stored in a computer readable storage medium such as a magnetic storage medium, an optical storage medium, a magneto-optical storage medium, or a semiconductor memory. The magnetic storage medium may be a magnetic tape, a magnetic disk, or the like. The optical storage medium may be an optical disk. Alternatively, this program may be downloaded via a communication line such as the Internet. Note that various apparatuses other than the CPU may be applied as the illustrated control unit, such as a dedicated processor.

Sixteenth Modification

In the above embodiment, as a display example of the templates, the templates are displayed as images in which regions of components of the templates are painted in different colors that are assigned to the respective types of components. However, the templates may be displayed in a different manner.

For example, in a case where an extracted template is generated from the original document described above, the control unit 11 of the document creation assistance apparatus 1 may control the display unit 15 to display the original document of the template to the user.

In addition, for example, the control unit 11 may cause the display unit 15 to display the extracted template to which the components of the first document are applied. In this case, the control unit 11 may extract the components of the first document when analyzing the first document.

In addition, for example, the control unit 11 may cause the display unit 15 to display the extracted template to which the obtained components are applied.

The control unit 11 may combine any of these display examples. For example, the control unit 11 may display the extracted template by using any two or more examples. Alternatively, the control unit 11 may change the display depending on the level of similarity of the extracted template with respect to the first document. For example, the control unit 11 may display a template having layout that is most similar to layout of the first document in a different manner from that for the other templates.

Note that the display of the template by the display unit 15 is an example of presentation of the template. For example, the control unit 11 of the document creation assistance apparatus 1 may present the extracted template by using a tactile display in which pins that are driven vertically are arranged in lattice.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A document creation assistance apparatus comprising:
    a processor reading and executing a computer program stored in a memory and configured to:
    obtain a first document;
    calculate a plurality of features related to layout of the first document, the calculation being based at least in part on types of components of the first document;
    extract one or more templates from among a plurality of templates based on the plurality of features related to the layout of the first document, the one or more templates each having layout similar to the layout of the first document; and
    present the extracted one or more templates to a user, wherein
    the processor determines a level of similarity in layout between the first document and each of the plurality of templates by calculating a sum of a plurality of numerical values multiplied by a plurality of respective evaluation coefficients which are calculated based on a history of template use of the user, the numerical values being absolute differences between the plurality of features of the first document and the plurality of features of the respective template, and extracts the one or more templates based on the determined levels of similarity.

2. The document creation assistance apparatus according to claim 1, wherein the processor is further configured to:
    accept selection of a template by the user from among the one or more templates; and
    create a second document having one or more components, the one or more components being arranged in accordance with the selected template.

3. The document creation assistance apparatus according to claim 2, further comprising:
    a storage that stores, on the storage, the plurality of templates such that each of the plurality of templates is stored in association with a plurality of features related to layout of a corresponding one of the plurality of templates,
    wherein the extraction of the one or more templates is based at least in part on a result of comparison between one or more of the plurality of features related to the layout of the first document and one or more of the plurality of features related to layout of each of the plurality of templates.

4. The document creation assistance apparatus according to claim 3,
    wherein the storage further stores a template use history, and
    wherein the extraction of the one or more templates is based at least in part on the template use history.

5. The document creation assistance apparatus according to claim 4,
    wherein the template use history includes information about a previously selected template and a user who has made the previous selection, and
    wherein the extraction of the one or more templates is based at east in part on the information.

6. The document creation assistance apparatus according to claim 4,
    wherein the template use history includes information about a previously selected template and components that have previously been arranged in accordance with the previously selected template, and
    wherein the extraction of the one or more templates is based at least in part on the information.

7. The document creation assistance apparatus according to claim 4,
    wherein the template use history includes information about a previously selected template and an attribute of another second document that has been created in accordance with the template, and
    wherein the extraction of the one or more templates is based at least in part on the information.

8. The document creation assistance apparatus according to claim 4,
    wherein the template use history includes information about a template that has previously been presented but has not been selected, and wherein the extraction of the one or more templates is based at least in part on the information.

9. The document creation assistance apparatus according to claim 3,
wherein the storage stores the plurality of templates, and
wherein the first document is added to the storage as a new template.

10. The document creation assistance apparatus according to claim 1,
wherein the plurality of features related to the layout of the first document include an area or an aspect ratio of each of the types of the components of the first document.

11. The document creation assistance apparatus according to claim 1,
wherein the plurality of features related to the layout of the first document include a variation in an area of a particular type of component of the first document.

12. A non-transitory computer readable medium storing a program causing a computer to execute a process for document creation assistance, the process comprising:
obtaining a first document;
calculating a plurality of features related to layout of the first document, the calculation being based at least in part on types of components of the first document;
extracting one or more templates from among a plurality of templates based on the plurality of features related to the layout of the first document, the one or more templates each having layout similar to the layout of the first document;
presenting the extracted one or more templates to a user; and
determining a level of similarity in layout between the first document and each of the plurality of templates by calculating a sum of a plurality of numerical values multiplied by a plurality of respective evaluation coefficients which are calculated based on a history of template use of the user, the numerical values being absolute differences between the plurality of features of the first document and the plurality of features of the respective template, and extracting the one or more templates based on the determined levels of similarity.

13. A document creation assistance apparatus comprising:
a processor reading and executing a computer program stored in a memory and comprising:
obtaining means for obtaining a first document;
analyzing means for calculating a plurality of features related to layout of the first document, the calculation being based at least in part on types of components of the first document;
extracting means for extracting one or more templates from among a plurality of templates based on the plurality of features related to the layout of the first document, the one or more templates each having layout similar to the layout of the first document;
presenting means for presenting the extracted one or more templates to a user and
determining means for determining a level of similarity in layout between the first document and each of the plurality of templates by calculating a sum of a plurality of numerical values multiplied by a plurality of respective evaluation coefficients which are calculated based on a history of template use of the user, the numerical values being absolute differences between the plurality of features of the first document and the plurality of features of the respective template, wherein the extracting means extracts the one or more templates based on the determined levels of similarity.

\* \* \* \* \*